(12) United States Patent
Miwa et al.

(10) Patent No.: US 11,423,947 B2
(45) Date of Patent: Aug. 23, 2022

(54) IMAGE RECORDING METHOD, IMAGE RECORDING PROGRAM, DATA PROCESSING APPARATUS, AND IMAGE RECORDING APPARATUS

(71) Applicants: Japan Agency for Marine-Earth Science and Technology, Yokosuka (JP); Okamoto Glass Co., Ltd., Kashiwa (JP)

(72) Inventors: Tetsuya Miwa, Yokosuka (JP); Dhugal Lindsay, Yokosuka (JP); Masafumi Shimotashiro, Yokosuka (JP); Hiroshi Takahashi, Kashiwa (JP); Atsushi Arai, Kashiwa (JP)

(73) Assignee: Japan Agency for Marine-Earth Science and Technology, Yokosuka (JP)

( * ) Notice: Subject to any disclaimer, the term of this patent is extended or adjusted under 35 U.S.C. 154(b) by 62 days.

(21) Appl. No.: 16/954,494

(22) PCT Filed: Dec. 11, 2018

(86) PCT No.: PCT/JP2018/046228
§ 371 (c)(1),
(2) Date: Jun. 16, 2020

(87) PCT Pub. No.: WO2019/124287
PCT Pub. Date: Jun. 27, 2019

(65) Prior Publication Data
US 2021/0166733 A1 Jun. 3, 2021

(30) Foreign Application Priority Data
Dec. 22, 2017 (JP) .............................. JP2017-246910

(51) Int. Cl.
*G11B 27/34* (2006.01)
*G03B 15/02* (2021.01)
(Continued)

(52) U.S. Cl.
CPC .............. *G11B 27/34* (2013.01); *G03B 15/02* (2013.01); *G03B 17/08* (2013.01); *H04N 5/2354* (2013.01);
(Continued)

(58) Field of Classification Search
CPC ........ G11B 27/34; G03B 15/02; G03B 17/08; G03B 2215/0542; G03B 2215/0557;
(Continued)

(56) References Cited

U.S. PATENT DOCUMENTS

2015/0002621 A1* 1/2015 Ratner ............... H04N 5/23238
348/36
2015/0363914 A1* 12/2015 Boyle .................... G01C 11/02
345/629
(Continued)

FOREIGN PATENT DOCUMENTS

CN 104914082 A 9/2015
EP 2866087 A1 4/2015
(Continued)

OTHER PUBLICATIONS

International Search Report, App. No. PCT/JP2018/046228, dated Jan. 29, 2019, 2 Pages.
(Continued)

*Primary Examiner* — Thai Q Tran
*Assistant Examiner* — Jose M Mesa
(74) *Attorney, Agent, or Firm* — Berkeley Law & Technology Group, LLP

(57) ABSTRACT

An image recording method in an image processing apparatus, includes the steps of acquiring, from a plurality of
(Continued)

cameras, respective video images which the plurality of cameras start capturing in the sea before a first light that is lit in a first color is turned on and end capturing after a second light that is lit in a second color is turned on after the first tight is turned on, detecting, for each of the video images, a difference in luminance between chronologically adjacent frames in the video image, associating times of frames between the video images on the basis of the difference, and recording the video images with the associated times in a recording medium.

11 Claims, 15 Drawing Sheets

(51) Int. Cl.
G03B 17/08 (2021.01)
H04N 5/247 (2006.01)
H04N 5/77 (2006.01)
H04N 5/235 (2006.01)
H04N 9/82 (2006.01)

(52) U.S. Cl.
CPC ............... *H04N 5/247* (2013.01); *H04N 5/77* (2013.01); *H04N 9/8205* (2013.01); *G03B 2215/0542* (2013.01); *G03B 2215/0557* (2013.01); *G03B 2215/0567* (2013.01)

(58) Field of Classification Search
CPC ......... G03B 2215/0567; H04N 5/2354; H04N 5/247; H04N 5/77; H04N 9/8205
See application file for complete search history.

(56) References Cited

U.S. PATENT DOCUMENTS

| 2016/0180884 A1 | 6/2016 | Nowak |
| 2017/0048494 A1 | 2/2017 | Boyle et al. |

FOREIGN PATENT DOCUMENTS

| JP | 49013196 B | 3/1974 |
| JP | 2003069864 A | 3/2003 |
| JP | 2012134585 A | 7/2012 |
| JP | 2012220859 A | 11/2012 |
| JP | 2012245944 A | 12/2012 |
| JP | 2016089026 A | 5/2016 |
| TW | 201308251 A | 2/2013 |
| WO | 2014171513 A1 | 10/2014 |

OTHER PUBLICATIONS

Extended European Search Report, App. No. 18891589.6, dated Sep. 7, 2021, 8 Pages.
Bonin, et al., "Imaging Systems for Advanced Underwater Vehicles", Journal of Maritime Research, vol. VIII, No. 1, Jan. 1, 2011, pp. 65-86, retrieved from the Internet,http://www.jmr.unican.es/index.php/jmr/article/view/146.
Office Action, App. No. CN2018800814608, filed Dec. 11, 2018, 11 Pages.

\* cited by examiner

FIG. 8

- Edokko-YYYYMMDD-HHMMSS-InternalDiameter-CameraMetadata.txt
- Edokko-YYYYMMDD-HHMMSS-InternalDiameter CAMERA1:CameraModelNumber-LensModelNumber-Rotation-XaxismmFromReferencePoint-YaxismmFromReferencePoint-ZaxismmFromReferencePoint-PanFromPlane1-TiltFromPlane1-Comments CAMERA2:CameraModelNumber-LensModelNumber-Rotation-XaxismmFromReferencePoint-YaxismmFromReferencePoint-ZaxismmFromReferencePoint-PanFromPlane1-TiltFromPlane1-Comments CAMERA3:CameraModelNumber-LensModelNumber-Rotation-XaxismmFromReferencePoint-YaxismmFromReferencePoint-ZaxismmFromReferencePoint-PanFromPlane1-TiltFromPlane1-Comments

FIG. 9

- CTD data filename to be Edokko-YYYYMMDD-HHMMSS-CTDdata.txt
- Text file format to be Edokko-YYYYMMDD-HHMMSS CTD:HHMMSSpXXX-pressure-depth_salt-temperature-salinity-userpoly1-userpoly2-userpoly3-userpoly4

CTD:HHMMSSpXXX-pressure-depth_salt-temperature-salinity-userpoly1-userpoly2-userpoly3-userpoly4

CTD:HHMMSSpXXX-pressure-depth_salt-temperature-salinity-userpoly1-userpoly2-userpoly3-userpoly4

IMAGE RECORDING METHOD, IMAGE RECORDING PROGRAM, DATA PROCESSING APPARATUS, AND IMAGE RECORDING APPARATUS

TECHNICAL FIELD

The present invention relates to an image recording method, an image recording program, a data processing apparatus, and an image recording apparatus.

Priority is claimed on Japanese Patent Application No. 2017-246910, filed in Japan on Dec. 22, 2017, and PCT Application PCT/JP2018/046228, filed on Dec. 11, 2018, the content of which are both incorporated herein by reference.

BACKGROUND ART

An image recording apparatus may stay on the seafloor for a long period of time and capture a video image for investigating ecology of the seafloor. Since the deep sea is dark, to allow a person to determine the exact color of an organism being imaged, the image recording apparatus needs to image the organism with a white light on. The image recording apparatus intermittently turns on the white light for the purpose of reducing power consumption of the image recording apparatus. The image recording apparatus starts imaging in synchronization with turning on of the white light.

CITATION LIST

Patent Literature

PTL1: Japanese Unexamined Patent Application, First Publication No. 2003-69864
PTL2: Japanese Unexamined Patent Application, First. Publication No. 2016-89026
PTL3: PCT International Publication No. WO2014/171513
PTL4: Japanese Unexamined Patent Application, First Publication No. 2012-245944
PTL5: Japanese Examined Patent Application, Second Publication No. S49-013196

DISCLOSURE OF INVENTION

Technical Problem

When the image recording apparatus suddenly turns on the white light, the organism to be imaged may move suddenly in response to the white light. Since the camera cannot image the organism that has moved suddenly and exited the imaging view angle, the image recording apparatus of the prior art cannot record images that accurately represent ecology of the seafloor.

Further, when an organism is imaged with a high sensitivity camera instead of turning on the white light in the image recording apparatus, power consumption due to the high sensitivity camera is great and thus the battery is exhausted and the image recording apparatus cannot stay on the seafloor for a long period of time. Therefore, the image recording apparatus needs to record images that accurately represent ecology of the seafloor using a white light and a camera with low power consumption. Thus, the image recording apparatus of the prior art has a problem that it cannot stay on the seafloor for a long period of time and record images that accurately represent ecology of the seafloor.

In addition, video images generated by a plurality of cameras of the image recording apparatus in the sea are recorded in respective storages of the cameras which are not synchronized in time. Therefore, the data processing apparatus of the prior art has a problem that even when video images generated in the sea by a plurality of cameras have been acquired, it is not possible to synchronize the times of the video images and record them in a recording medium.

In view of the above circumstances, it is an object of the present invention to provide an image recording method, an image recording program, a data processing apparatus, and an image recording apparatus which can synchronize the times of video images generated in the sea by a plurality of cameras and record them in a recording medium.

Solution to Problem

An aspect of the present invention is an image recording method in an image processing apparatus, the image recording method including the steps of acquiring, from a plurality of cameras, respective video images which the plurality of cameras start capturing in the sea before a first light that is lit in a first color is turned on and end capturing after a second light that is lit in a second color is turned on after the first light is turned on, detecting, for each of the video images, a difference in luminance between chronologically adjacent frames in the video image, associating times of frames between the video images on the basis of the difference, and recording the video images with the associated times in a recording medium.

An aspect of the present invention is the above image recording method, wherein, in the associating step, times of frames at which the difference in luminance between chronologically adjacent frames is equal to or greater than a threshold value are associated between the video images.

An aspect of the present invention is the above linage recording method, wherein, in the recording step, the video images and respective metadata are associated by time and recorded in a recording medium.

An aspect of the present invention is the above image recording method, wherein, in the acquiring step, at least one of a plurality of first lights is lit in a third color other than the first and second colors after at least one of the first lights is lit in the first color, and the second light is lit in the second color after the first light is lit in the third color.

An aspect of the present invention is the above image recording method, wherein the first color is a specific color other than blue, the second color is white, and the third color is a specific color other than blue and the first color.

An aspect of the present invention is a computer readable storage medium storing an image recording program causing a computer to execute a procedure for acquiring, from a plurality of cameras, respective video images which the plurality of cameras start capturing in the sea before a first light that is lit in a first color is turned on and end capturing after a second light that is lit in a second color is turned on after the first light is turned on, a procedure for detecting, for each of the video images, a difference in luminance between chronologically adjacent frames in the video image, a procedure for associating times of frames between the video images on the basis of the difference, and a procedure for recording the video images with the associated times in a recording medium.

An aspect of the present invention is an image processing apparatus including an acquirer configured to acquire, from a plurality of cameras, respective video images which the plurality of cameras start capturing in the sea before a first light that is lit in a first color is turned on and end capturing after a second light that is lit in a second color is turned on after the first light is turned on, a detector configured to detect, for each of the video images, a difference in luminance between chronologically adjacent frames in the video image, a linker configured to associate times of frames between the video images on the basis of the difference, and a controller configured to record the video images with the associated times in a recording medium.

An aspect of the present invention is an image recording apparatus including a camera unit configured to image a subject in the sea, a first light unit having a first light that is lit in a first color, a storage configured to store an image generated by the camera unit, and a controller configured to turn on the first light after the camera unit starts imaging.

An aspect of the present invention is the above image recording apparatus, further including a second light unit having a second light that is lit in a second color, wherein the controller is configured to turn on the second light after a predetermined time elapses front turning on of the first light unit.

An aspect of the present invention is the above image recording apparatus, wherein the first light unit has a plurality of first lights arranged at intervals of a predetermined reference space, and the camera unit is configured to image the plurality of first lights and the subject.

An aspect of the present invention is the above image recording apparatus, wherein the camera unit includes a plurality of cameras, and the plurality of cameras are configured to image the subject from different directions.

An aspect of the present invention is the above image recording apparatus, wherein the camera unit is configured to image a shadow of the image recording apparatus projected on a seafloor.

An aspect of the present invention is the above image recording apparatus, wherein the storage stores at least one of imaging time information and a latitude, a longitude, and a water depth of the image recording apparatus in association with the image.

Advantageous Effects of Invention

According to the present invention, it is possible to synchronize the times of video images generated in the sea by a plurality of cameras and record them in the recording medium.

BRIEF DESCRIPTION OF DRAWINGS

FIG. 8 is a diagram showing an example of the format of camera arrangement information in the first embodiment.

FIG. 9 is a diagram showing an example of the format of CTD data in the first embodiment.

EXEMPLARY EMBODIMENTS FOR CARRYING OUT THE INVENTION

Embodiments of the present invention will be described in detail with reference to the drawings.

First Embodiment

Figure 1:
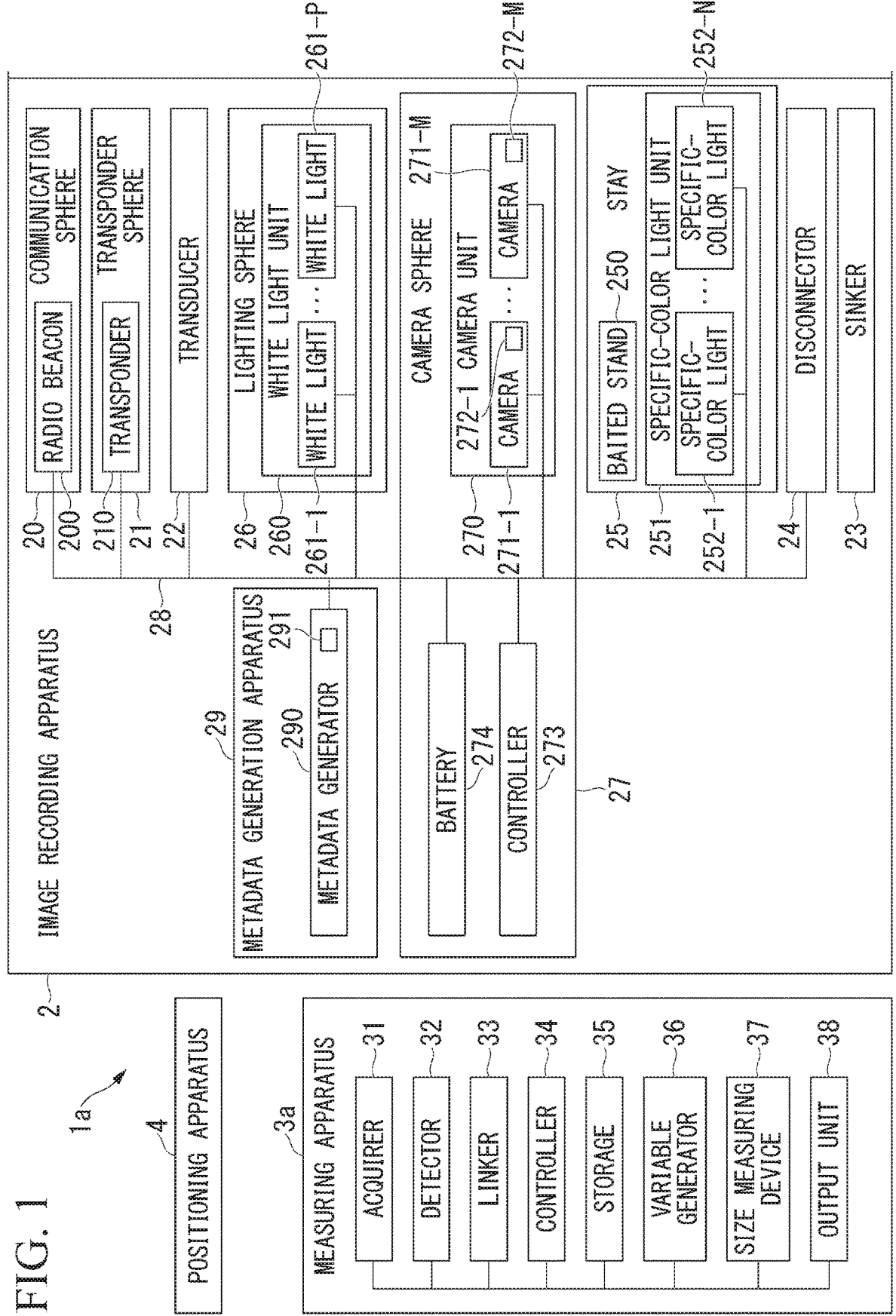
FIG. 1 is a diagram showing an example of the configuration of an image recording system in a first embodiment.

FIG. 1 is a diagram showing an example of the configuration of an image recording system 1*a*. The image recording system 1*a* is a system for recording images of an undersea environment (underwater environment). The images of the undersea environment are, for example, moving or still images of marine organisms. The image recording system 1*a* includes an image recording apparatus 2, a measuring apparatus 3*a*, and a positioning apparatus 4.

The image recording apparatus 2 is a apparatus (undersea explorer) that records images in undersea environments. The image recording apparatus 2 is s in the sea and stays at the seafloor for a long period of time. The long period of time is, for example, one year. The image recording apparatus 2 is recovered to a mother ship after floating to the sea surface.

The measuring apparatus 3*a* is a data processing apparatus (information processing apparatus). The measuring apparatus 3*a* acquires an image and metadata such as conductivity, temperature, and depth (CTD) from the image recording apparatus 2 that has been recovered to the mother ship. The measuring apparatus 3*a* is a apparatus that performs a predetermined measuring process on the basis of the image or the like acquired from the image recording apparatus 2. The predetermined measuring process is, for example, a process of measuring the length or size of an organism imaged by the image recording apparatus 2 on the basis of the image.

The positioning apparatus 4 is installed on the mother ship of the image recording apparatus 2. The positioning apparatus 4 measures the distance between the image recording apparatus 2 and the mother ship through acoustic communication between the image recording apparatus 2 undersea and the positioning apparatus 4. The positioning apparatus 4 measures the position of the image recording apparatus 2 at the seafloor on the basis of the distance from the mother ship to the image recording apparatus 2 and the water depth of the image recording apparatus 2. The positioning apparatus 4 may also determine the position of the image recording apparatus 2 through post-processing that uses water depth data stored in the storage of the image recording apparatus 2 after the image recording apparatus 2 is recovered to the mother ship. The positioning apparatus 4 records position information of the image recording apparatus 2 in the storage such that the position information is distinguished from image data. The positioning apparatus 4 measures the latitude and longitude of the mother ship, for example, using radio waves transmitted from satellites.

Next, an example of the configuration of the image recording apparatus 2 will be described.

The image recording apparatus 2 includes a communication sphere 20, a transponder sphere 21, a transducer 22, a sinker 23 (a weight), a disconnector 24, an stay 25 (an arm), a lighting sphere 26, a camera sphere 27, a cable 28, and a metadata generation apparatus 29.

The communication sphere 20 houses a radio beacon 200. When the image recording apparatus 2 has floated up to the sea surface, the radio beacon 200 transmits a beacon signal using radio waves.

The transponder sphere 21 is a pressure-resistant container that houses a transponder 210. The pressure-resistant container is, for example, a pressure-resistant glass sphere. The transponder 210 is an acoustic transponder. The transponder 210 performs acoustic communication between the positioning apparatus 4 installed in the mother ship and the transponder 210. A result of the acoustic communication is used, for example, to measure the distance between the mother ship and the image recording apparatus 2.

The transponder 210 acquires a command signal transmitted from the mother ship through acoustic communication. The command signal is, for example, a signal representing a command to release the sinker 23 that rests on the seafloor from the image recording apparatus 2. When the transponder 210 has acquired the command signal transmitted through acoustic communication from the mother ship, the transponder 210 may transmit a response signal through acoustic communication.

The transducer 22 generates an electric signal in accordance with the command signal acquired by the transponder 210. The transducer 22 outputs an electric signal corresponding to the command signal to a controller provided in the camera sphere 27. The transducer 22 amplifies an electric signal acquired from the controller provided in the camera sphere 27. The transducer 22 outputs the amplified electric signal to the transponder 210.

Figure 2:
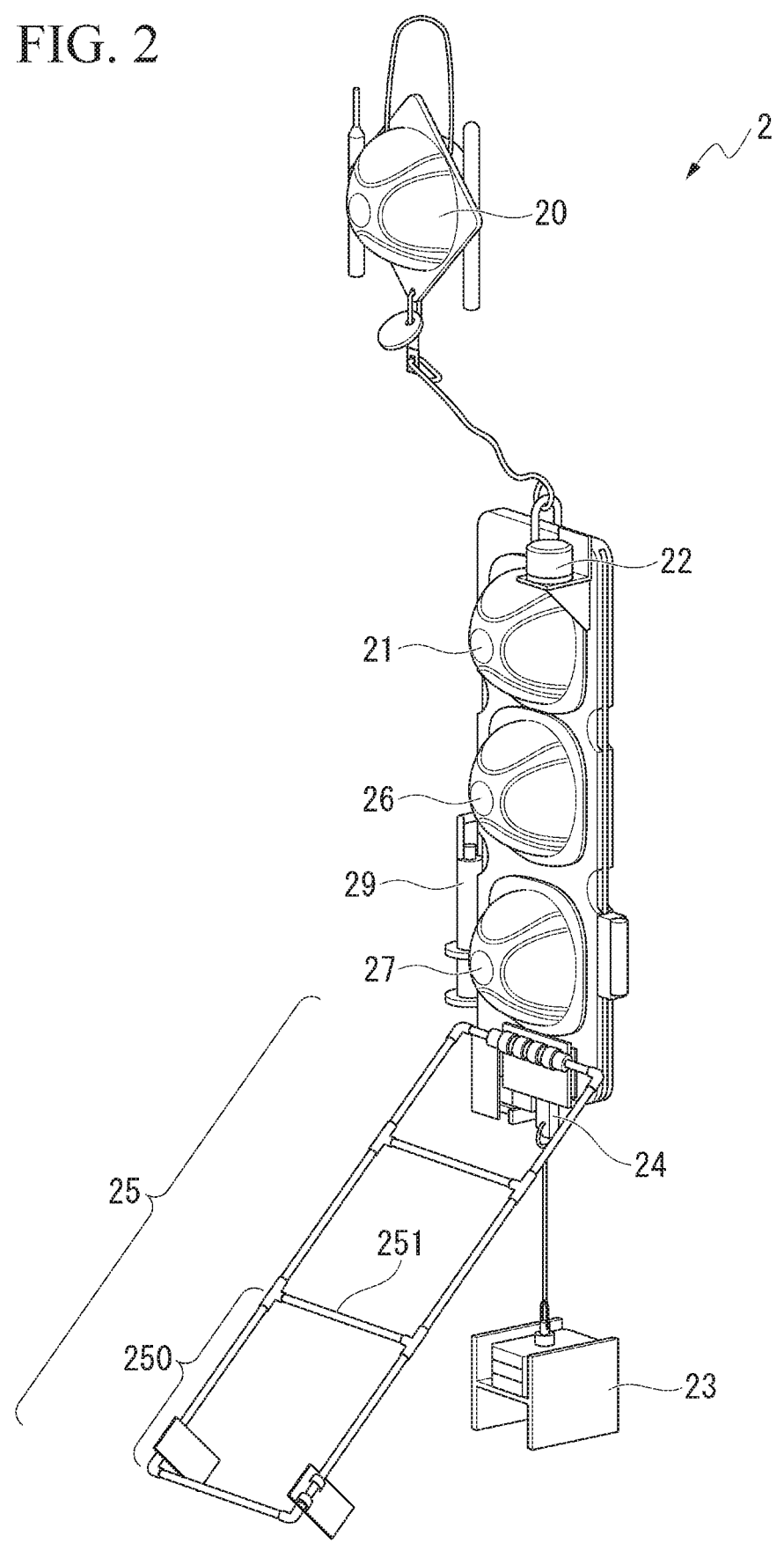
FIG. 2 is a diagram showing an example of the appearance of the image recording apparatus in the first embodiment.

FIG. 2 is a diagram showing an example of the appearance of the image recording apparatus 2. The image recording apparatus 2 having buoyancy is connected to the sinker 23 that rests on the seafloor, whereby the image recording apparatus 2 maintains a vertical posture at a predetermined altitude from the seafloor.

When the transponder 210 has acquired, from the mother ship, a command signal for releasing the sinker 23 from the image recording apparatus 2, the disconnector 24 releases the sinker 23 under control of the controller provided in the camera sphere 27. This allows the image recording apparatus 2 to float to the sea surface.

The stay 25 includes a baited stand 250 and a specific-color light unit 251. The baited stand 250 is a frame for providing bait for an organism to be imaged. The specific-color light unit 251 includes lights that emit light of a specific color(s). The specific-color light unit 251 is disposed near the baited stand 250.

Figure 3:
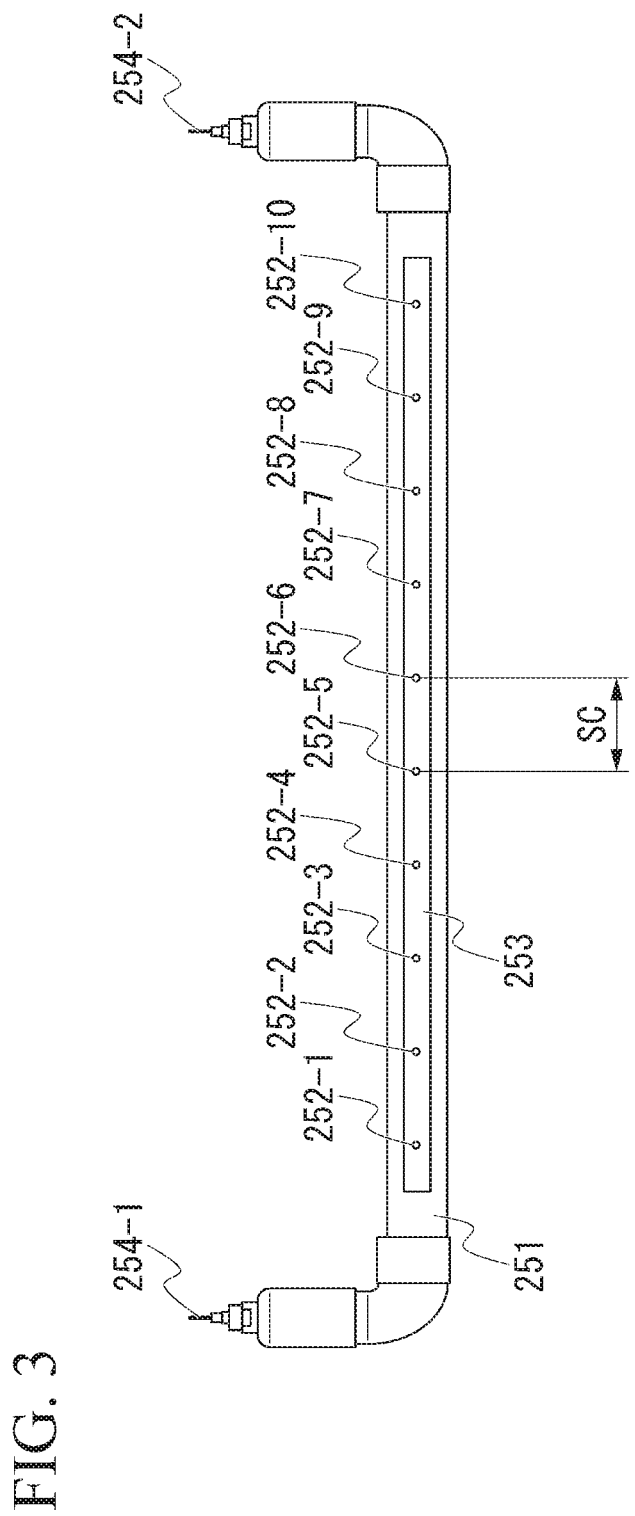
FIG. 3 is a diagram showing an example of the appearance of a specific-color light unit in the first embodiment.

FIG. 3 is a diagram showing an example of the appearance of the specific-color light unit 251. The color of the specific-color light unit 251 is, for example, transparent. The shape of the specific-color light unit 251 is, for example, tubular. Silicone oil is injected into the tube of the specific-color light unit 251. This allows the specific-color light unit 251 to withstand high water pressure.

The specific-color light unit 251 includes specific-color lights 252-1 to 252-N (N is an integer of 2 or more and is 10 as an example in FIG. 3), a light board 253, and power supply terminals 254. The length of the specific-color light unit 251 is, for example, 0.60 m. The specific-color lights 252 are lights of a specific color(s) other than blue. The wavelength of light of the specific color other than blue is, for example, a wavelength other than roughly 450 to 495 nm. Specific colors other than blue are, for example, red, yellow, and orange. For example, at least one of the plurality of specific-color lights 252 is lit not in red, blue or white but in yellow after another specific-color light 252 is lit in red.

Light output from the specific-color lights 252 may include blue light, provided that the intensity of blue light among light output from the specific-color lights 252 is relatively lower than the intensity of light other than blue light.

A specific-color light 252-$n$ ($n$ is any of 1 to N) emits light, for example, with an output (power consumption) of 0.77 W. Therefore, the specific-color lights 252-1 to 252-10 emit light with an output of 7.7 W in total. The brightness of the specific-color lights 252-1 to 252-10 is, for example, 750(=75×10) 1 m in total.

The specific-color lights 252 are not limited to a specific type of light source and are, for example, red light emitting diodes (LEDs). The specific-color lights 252 are turned on or off under control of the controller provided in the camera sphere 27. Since the specific-color lights 252 are disposed near the baited stand 250, the specific-color lights 252 emit light near organisms to be imaged (subjects). Many marine organisms have high sensitivity to blue light. Therefore, organisms to be imaged are less likely to move suddenly in response to red or yellow light.

The light board 253 includes a plurality of specific-color lights 252 (line light sources) arranged at intervals of a predetermined reference space (SC) (pitch). The reference space is, for example, 50 mm. A camera unit 270 images adjacent specific-color lights 252 and an organism to be imaged such that both are included in the same image (imaging view angle).

This allows the measuring apparatus 3a shown in FIG. 1 to easily compare the length of the reference space and the length of an organism to be imaged in the image generated by the camera unit 270. The measuring apparatus 3a can measure the length and size of the organism to be imaged on the basis of a result of comparing the length of the reference space and the length of the organism to be imaged in the image.

Returning to FIG. 1, the description of the example of the configuration of the image recording apparatus 2 will be continued. The lighting sphere 26 is a pressure-resistant container that houses a white light unit 260. The white light unit 260 includes white lights 261-1 to 261-P (P is an integer of 1 or more).

Figure 4:
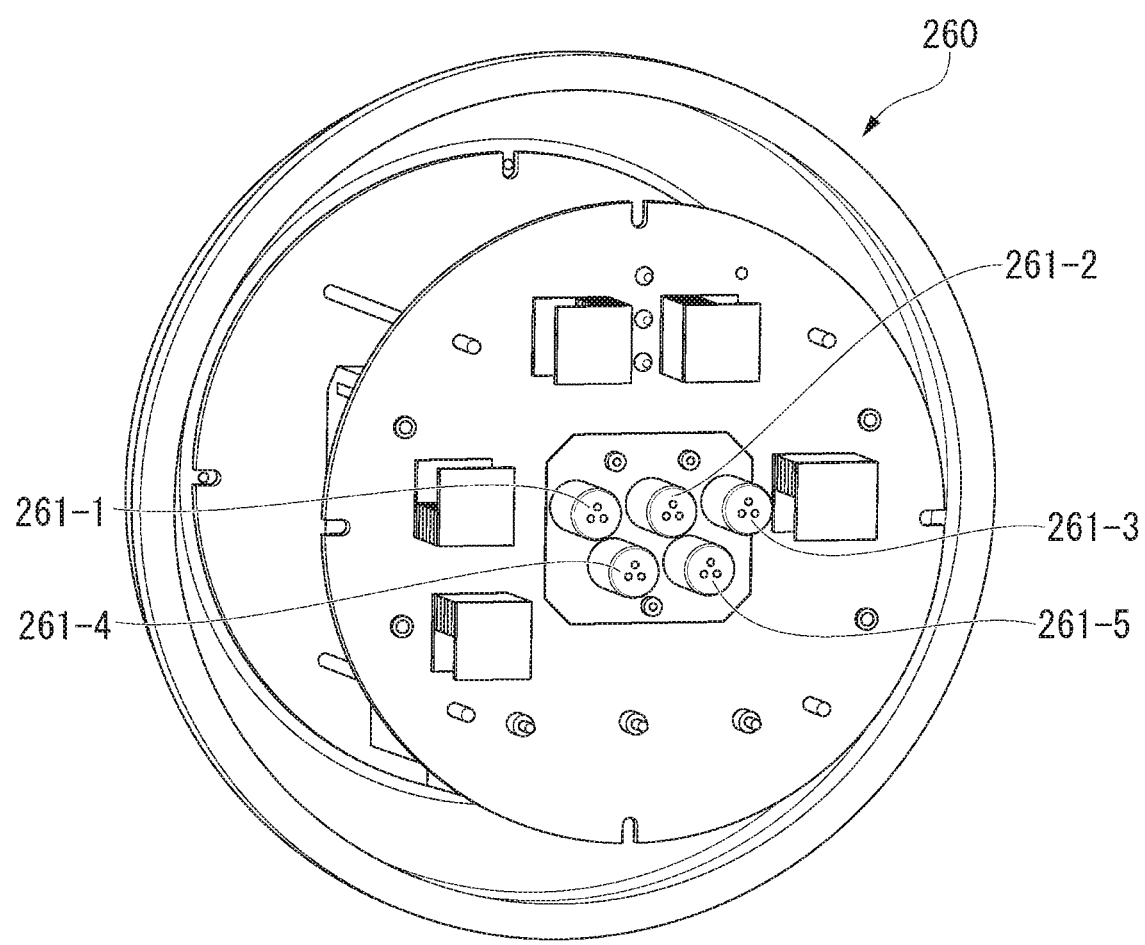
FIG. 4 is a diagram showing an example of the appearance of a white light unit in the first embodiment.

FIG. 4 is a diagram showing an example of the appearance of the white light unit 260. The white lights 261 (searchlights) are not limited to a specific type of light source and are, for example, red, green and blue LEDs. The white light unit 260 may be, for example, a light including a blue LED and a yellow fluorescent body.

The white lights 261 output white light to the baited stand 250 of the stay 25 and the area around the same.

One of three lamps of a white light 261-$p$ ($p$ is any of 1 to P and is 5 as an example in FIG. 4) emits light, for example, with an output of 2.19 W. Therefore, the white lights 261-1 to 261-5 emit light, for example, with an output of 32.9(=2.19×3×5) W. The brightness of the white lights 261-1 to 261-5 is, for example, 405(=270×3×5) 1 m.

Returning to FIG. 1, the description of the example of the configuration of the image recording apparatus 2 will be continued. The camera sphere 27 is a pressure-resistant container that houses the camera unit 270, a controller 273, and a battery 274. The camera unit 270 includes cameras 271-1 to 271-M (M is an integer of 2 or more). A camera 271-$m$ includes an image data storage 272-$m$ ($m$ is any of 1 to M). The resolution of the camera 271 is, for example, (3840×2160). The plurality of cameras 271 are stereo cameras and image the subject from different directions. This allows the plurality of cameras 271 to three-dimensionally capture an organism to be imaged.

Figure 5:
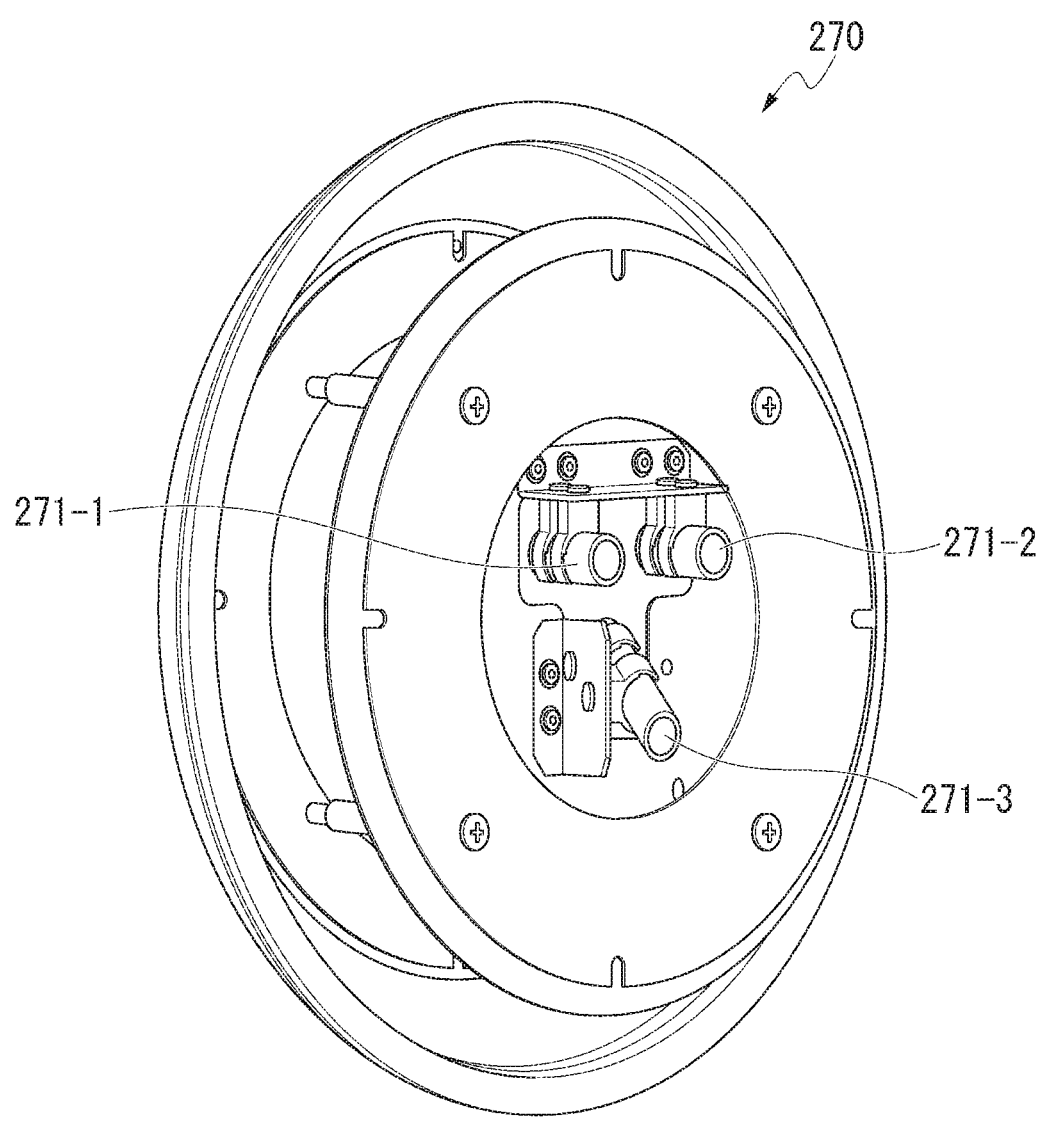
FIG. 5 is a diagram showing a first example of the appearance of a camera unit the first embodiment.

FIG. 5 is a diagram showing a first example of the appearance of the camera unit 270. The cameras 271-1 and 271-2 are stereo cameras arranged in the horizontal direction and a the subject from different horizontal directions. When the camera 271-1 and the camera 271-2 are stereo cameras arranged in the horizontal direction, the specific-color light unit 251 shown in FIGS. 2 and 3 is arranged in the horizontal direction.

Figure 6:
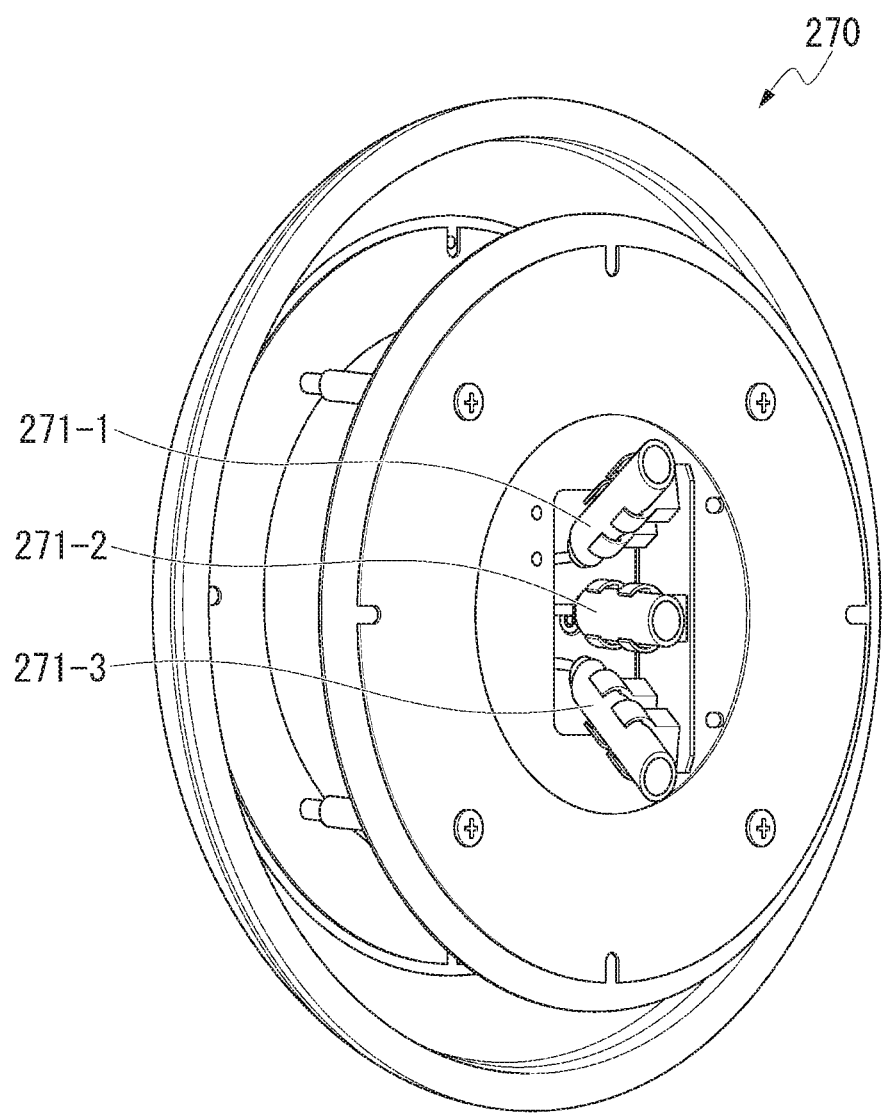
FIG. 6 is a diagram showing a second example of the appearance of the camera unit in the first embodiment.

FIG. 6 is a diagram showing a second example of the appearance of the camera unit 270. The cameras 271-1 and 271-2 are stereo cameras arranged in the vertical direction and image the subject from different vertical directions. When the camera 271-1 and the camera 271-2 are stereo cameras arranged in the vertical direction, the specific-color light unit 251 shown in FIGS. 2 and 3 may be arranged in the vertical direction. Even when the camera 271-1 and the camera 271-2 are stereo cameras arranged in the vertical direction, the specific-color light unit 251 may be arranged in the horizontal direction. The arrangement direction of the specific-color light unit 251 in the image may be changed by image processing.

In FIGS. 5 and 6, the camera 271-3 is a downward-view camera which images, for example, the seafloor downward from the image recording apparatus 2. The camera 271-3 may mage the sinker 23 that rests on the seafloor. The F value of the camera 271 is, for example, 6 mm.

Figure 7:
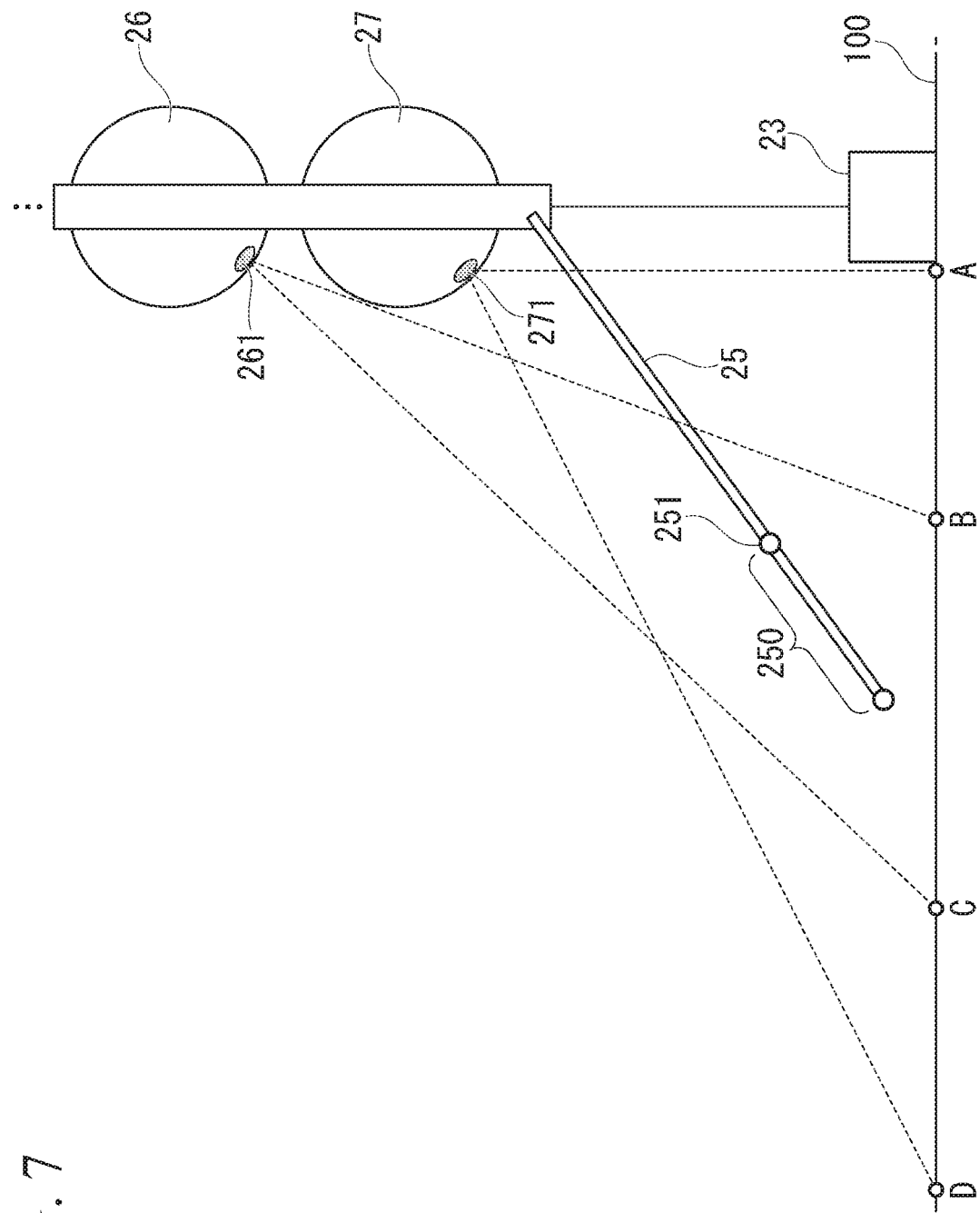
FIG. 7 is a diagram showing an example of an imaging range in the first embodiment.

FIG. 7 is a diagram showing an example of an imaging range (a range from position A to position D). The specific-color light unit 251 outputs specific light other than blue under control of the controller 273. The specific-color light unit 251 outputs specific light other than blue to the area around the baited stand 250. The white lights 261 output white light under control of the controller 273. The white lights 261 output white light to the baited stand 250 of the stay 25 and the area around the same. A line connecting the white lights 261 and the position B is a line of sight. A part of the white light output from the white lights 261 is shielded by the camera sphere 27 before reaching the seafloor 100. In FIG. 7, the white light output from the white lights 261 does not reach the range from the position A to the position B on the seafloor 100. Thus, the white lights 261 output white light over the range from the position B to the position C on the seafloor 100 in the imaging range (which is the range from the position A to the position D).

The plurality of cameras 271 three-dimensionally image the imaging range from the position A to the position D on the seafloor 100. For example, the camera 271-1 can image the imaging range such that an image of the specific-color light unit 251 taken from the position of the camera 271-1 and an image of an organism taken from the position of the camera 271-1 are included in a first image (an imaging view angle of the camera 271-1). For example, the camera 271-2 can image the imaging range such that an image of the specific-color light unit 251 taken from the position of the camera 271-2 and an image of an organism taken from the position of the camera 271-2 are included in a second image (an imaging view angle of the camera 271-2).

The cable 28 is a wired submarine cable through which electric signals propagate between the functional units of the image recording apparatus 2. The cable 28 connects the radio beacon 200, the transponder 210 the specific-color light unit 251, the white light unit 60, the camera unit 270, and the controller 273 such that they can communicate with each other. The functional units connected to each other by the cable 28 can synchronize and communicate with each other even when the image recording apparatus 2 is submerged in the sea. The cable 28 may also supply electric power to each functional unit.

The controller 273 is a data processing device such as a CPU. The controller 273 is housed in the camera sphere 27, Some or all of the controller 273 and a metadata generator 290 are software functional units, each of which a processor such as a central processing unit (CPU) causes to function by executing a program stored in a memory. Some or all of these functional units may also be hardware functional units such as large scale integration (LSI) or an application specific integrated circuit (ASIC).

The image data storages 272 and the metadata storage 291 are storage apparatuses having a nonvolatile recording medium (non-transitory recording medium) such as a magnetic hard disk device or a semiconductor storage apparatus.

The metadata storage 291 stores at least one of imaging time information, latitude, longitude and depth of the metadata generation apparatus 29 in association with the image.

The image data storage 272-$m$ ($m$ is any of 1 to M) stores an image generated by the camera unit 271-$m$.

The metadata generation apparatus 29 includes the metadata generator 290. The metadata generator 290 includes the metadata storage 291. The metadata generator 290 is a sensor that measures the electrical conductance (conductivity), water temperature, and water pressure of sea water around the metadata generation apparatus 29. The metadata generator 290 may operate independent of the control of the controller 273 or may operate under control of the controller 273. In FIG. 1, the metadata generator 290 operates under control of the controller 273 as an example.

When the metadata generator 290 operates independent of the control of the controller 273, the metadata generation apparatus 29 further includes a clock. The clock of the metadata generation apparatus 29 is time-adjusted immediately before the image recording apparatus 2 drops into the sea.

The metadata generator 290 records time information and measurement results in the metadata storage 291 as generated metadata. For example, the metadata generator 290 records the CTD data generated by the metadata generator 290 in the metadata storage 291 as metadata. For example, the metadata generator 290 records local time information at the position of the image recording apparatus 2 in association with any of the imaging time of the image or the time of the metadata generation apparatus 29 in the metadata storage 291 as metadata. The metadata recorded in the metadata storage 291 is analyzed after the image recording apparatus 2 floats to the sea surface and is recovered to the mother ship.

The water depth is determined on the basis of the latitude representing the position of the image recording apparatus 2 and the water pressure around the image recording apparatus 2.

The metadata storage 291 stores the CTD data generated by the metadata generator 290 as metadata. The metadata storage 291 stores the local time information at the position of the image recording apparatus 2 in association with any of the imaging time of the image or the time of the metadata generation apparatus 29 as metadata.

The total power consumption of the camera unit 270 is, for example, 2.85 W. To reduce the power consumption, it is necessary to shorten the cumulative on time of the specific-color light unit 251 and the white lights 261. Therefore, the controller 273 intermittently turns on the specific-color light unit 251 and the white lights 261.

The controller 273 outputs a control signal to the camera unit 270 such that the camera unit 270 images undersea, for example, for about 1 to 5 seconds or longer in a state in which the specific-color light unit 251 and the white lights 261 are off.

Since the deep sea is dark, when the white lights 261 are on, the organism to be imaged is likely to move suddenly in response to white light. To reduce the possibility that the organism to be imaged exits the imaging view angle before the camera unit 270 images undersea, the controller 273 turns on the specific-color light unit 251 in a state in which the camera unit 270 is imaging undersea. This allows the camera unit 270 to capture the organism to be imaged, on which specific-color light output from the specific-color light unit 251 is projected, for example, for about 1 to 5 seconds or longer or longer.

The controller 273 turns off the specific-color light unit 251 after turning on the specific-color light unit 251, for example, for about 1 to 5 seconds or longer in a state in which the camera unit 270 is imaging undersea, and turns on the white light unit 260. Here, the controller 273 may turn on the white light unit 260 before the period during which the specific-color light unit 251 is on ends. That is, the period during which the specific-color light unit 251 is on may overlap with a part of the period during which the white tight unit 260 is on.

It is to be noted that the measuring apparatus 3a can synchronize video images captured by the respective cameras 271 by aligning frames at which the white lights 261 are turned on in the time direction among a plurality of frames that constitute the video images captured by the respective cameras 271.

The battery 274 supplies power to the functional units of the image recording apparatus via the cable 28 for a long period of time such as one year. The battery 274 is housed, for example, in the camera sphere 27.

Next, an example of the configuration of the measuring apparatus 3a will be described.

The measuring apparatus 3a includes an acquirer 31, a detector 32, a linker 33, a controller 34, a storage 35, a variable generator 36, a size measuring device 37, and an output unit 38. The acquirer 31 acquires images stored in the image data storages 272 of the image recording apparatus 2. The acquirer 31 acquires metadata such as CTD data stored in the metadata storage 291 of the image recording apparatus 2. The acquirer 31 records images or metadata such as CTD data in the storage 35. The detector 32 detects the difference in luminance between chronologically adjacent frames for each video image. The linker 33 associates the times of frames between the video images on the basis of the difference.

The linker 33 associates the times of frames at which the difference in luminance between chronologically adjacent frames is equal to or greater than a threshold value between the video images. The controller 34 records the video images with the associated times in the storage 35 (non-transitory recording medium).

The controller 34 may generate a panoramic image (wide range image) from a plurality of images by connecting a plurality of images stored in the image data storages 272. The controller 34 may generate a panoramic image such that the contours of a plurality of images (frames) are in contact with each other. The controller 34 may generate a panoramic image such that a plurality of images (frames) overlap partly.

The storage 35 stores the images stored in the image data storages 272 of the image recording apparatus 2. The storage 35 stores the metadata such as CTD data stored in the metadata storage 291 of the image recording apparatus 2. The storage 35 stores information representing the relationship between the images generated by the cameras 271 (hereinafter referred to as "link information") in a storage area different from the storage area of the images. The link information is, for example, imaging date, imaging time information, or camera arrangement information. The size measuring device 37 can easily perform data analysis of ecology of the seafloor or the like on the basis of the images, the metadata, and the link information.

FIG. 8 is a diagram showing an example of the format of the camera arrangement information. In the camera arrangement information, "YYYYMMDD" represents the year, month, and day of the local time. "HHMMSS" represents the time (hour, minute, second) of the local time.

"CAMERA 1" represents, for example, the camera 271-1. "CameraModelNumber" is a number representing the manufacturer and model of the camera. "LensModelNumber" is a number representing the manufacturer and model of the lens of the camera.

"Rotation" is expressed as "r_H (horizontal)" when the long axis of the image pickup element is horizontal. For example, "Rotation" is "r_H (horizontal)" when the aspect ratio (horizontal:vertical) of the screen on which the image is displayed is 16:9. "Rotation" is expressed as "r_V (vertical)" when the long axis of the image pickup element is vertical.

"ReferencePoint" represents the center (reference point) of the camera sphere 27. "ReferencePoint" may also be the center of the front face or the opposite face of the camera sphere 27. The image pickup element of the camera 271 is located away from the side face "Plane 1" of a cube that supports the camera 271. The distance of the camera is represented by the distance from the reference point to the center of the image pickup element. Normally, since the camera 271 is arranged to the left of the reference point, the distance of the camera with respect to the x-axis direction is a negative value. In many cases, the distance of the camera with respect to the y axis direction is a negative value. When the image pickup element of the camera 271 is in front of the side face "Plane 1" and components of the camera 271 other than the image pickup element are behind the side face "Plane 1," the distance of the camera with respect to the z axis direction is a positive value.

"PanFromPlane 1" is a pan value in the horizontal direction (inclination of the optical axis in the left-right direction) with reference to the side face "Plane 1." A pan value of "0"

represents the normal direction to the side face "Plane 1." A pan value for the right is positive. The pan value for the left is negative.

"TiltFromPlane 1" is a tilt value in the vertical direction (inclination of the optical axis in the vertical direction) with reference to the side face "Plane 1." A tilt value of "0" represents the normal direction to the side face "Plane 1." A tilt value for the upward direction is positive. A tilt value for the downward direction is negative. "Comments" are, for example, comments indicating whether or not a zoom ratio has been set and the set zoom ratio.

FIG. 9 is a diagram showing an example of the format of the CTD data. "HHMMSS" represents the time (hour, minute, second) of the local time. When the time is expressed with higher accuracy than seconds, the time of the local time is expressed in a format of "HHMMSSpXXX." Here, "p" represents a decimal point. "XXX" represents the decimal part of the seconds.

"Pressure" represents water pressure in decibels. "Depth_salt" represents "water depth in salt water" based on the latitude of the measured position in meters. "Temperature" represents water temperature in degrees Celsius. "Salinity" represents salt concentration based on electrical conductance, water temperature, and water pressure without units of measure. An area of "userpoly" is a recording area of user data. The user data is, for example, data such as oxygen concentration and turbidity that may be recorded together with the CTD data.

Returning to FIG. 1, the description of the example of the configuration of the measuring apparatus 3a will be continued. The variable generator 36 generates a measurement variable by performing contour detection processing on an image generated by the camera 271. For example, the variable generator 36 acquires a variable for measuring the length of the subject which is the organism to be imaged by performing contour detection processing on the image generated by the camera 271. The variable generator 36 acquires a variable representing the distance between specific-color lights 252 adjacent to each other in the image by performing contour detection processing on the image generated by the camera 271.

Figure 10:
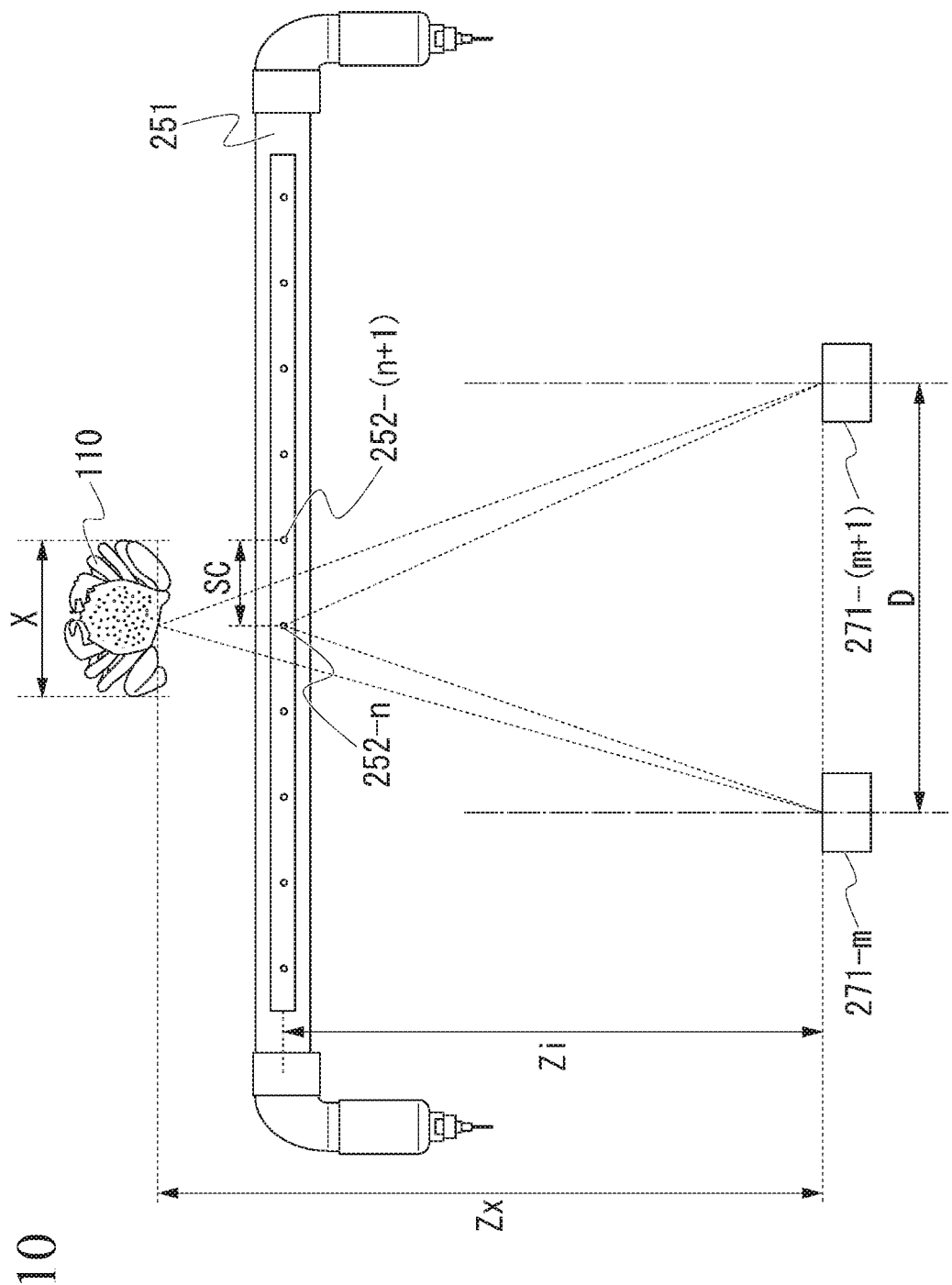
FIG. 10 is a diagram showing an example of the length of a subject which is an organism to be imaged in the first embodiment.

FIG. 10 is a diagram showing an example of the length of a subject 110 which is an organism to be imaged. The plurality of cameras 271 of the camera unit 270 image the subject 110 and the specific-color light unit 251. In FIG. 10, the distance in the horizontal direction between the camera 271-$m$ and the camera 271-($m$+1) is D.

A predetermined distance from each camera 271 to the specific-color lights 252 is Zi. The distance from each camera 271 to the subject 110 is Zx.

The size, measuring device 37 measures the difference (parallax Bx) between the position of the subject 110 in an image generated by the first camera 271 and the position of the subject 110 in an image generated by the second camera 271. The size measuring device 37 measures the difference (parallax Bi) between the position specific-color light 252 in the image generated by the first camera 271 and the position of the specific-color light 252 in the generated by the second camera 271. The plurality of specific-color lights 252 are arranged on the specific-color light unit 251 at intervals of the predetermined reference space SC.

The size measuring device 37 determines a coefficient K representing ratio between the reference space SC and the length of the image of the subject 110 in the image generated by the camera 271 on the basis of the size of the subject 110 in the image and the reference space between the specific-color lights 252 in the image. The size measuring device 37 measures the length X of the subject 110 on the basis of the reference space SC, the coefficient K, the distance Zi, and the distance Zx.

The predetermined distance Zi is expressed by equation (1).

$$Zi = D \times Fs / Bi \qquad (1)$$

Here, Fs represents the focal length of the lens of the camera 271. Bi represents the parallax between the position of an image of a specific-color light 252-$n$ in an image generated by a camera 271-$m$ and the position of an image of the specific-color light 252-$n$ in an image generated by a camera 271-($m$+1). That is, Bi represents the distance between the position of the image of the specific-color light 252-$n$ at the imaging view angle of the camera 271-$m$ and the position of the image of the specific-color light 252-$n$ at the imaging view angle of the camera 271-($m$+1).

The distance Zx is expressed by equation (2).

$$Zx = D \times Fs / Bx \qquad (2)$$

Here, Bx represents the parallax between the position of the image of the subject 110 in the image generated by the camera 271-$m$ and the position of the image of the subject 110 in the image generated by the camera 271-($m$+1). That is, Bx represents the distance between the position of the image of the subject 110 at the imaging view angle of the camera 271-$m$ and the position of the image of the subject 110 at the imaging view angle of the camera 271-($m$+1).

The length of the subject 110 in the image generated by the camera 271 varies in proportion to the distance from the camera 271 to the subject 110. Therefore, equation (3) holds.

$$Zi : Zx = K \times SC : X \qquad (3)$$

Here, K is a coefficient representing the ratio between the reference space SC and the length of the image of the subject 110 in the image generated by the camera 271. The size measuring device 37 calculates the length X of the subject 110 on the basis of equation (4).

$$X = K \times SC \times Bi / Bx \qquad (4)$$

The output unit 38 is a display device. The output unit 38 displays information representing the length X of the subject 110. The output unit 38 may also output an image generated by each camera 271. The output unit 38 may display imaging time information, superimposed on the image generated by each camera 271.

Next, an example of the operation of the image recording apparatus 2 will be described.

Figure 11:
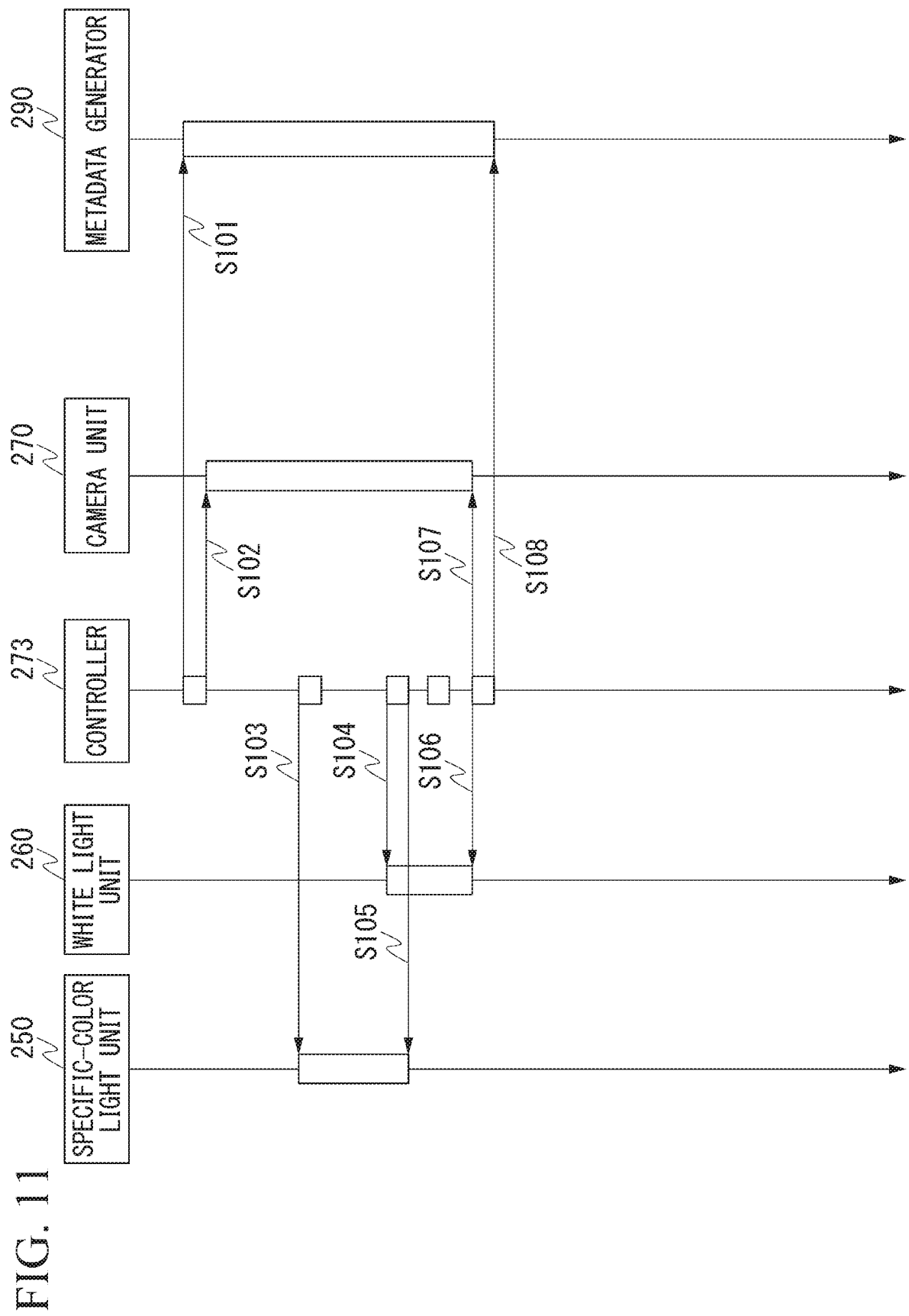
FIG. 11 is a sequence diagram showing an example of the operation of the image recording apparatus in the first embodiment.

FIG. 11 is a sequence diagram showing an example of the operation of the image recording apparatus 2. The controller 273 instructs the metadata generator 290 to start generating metadata. The metadata may include information indicating the turn-on time of the white light unit 260. The metadata generator 290 records the generated metadata in the metadata storage (step S101). The controller 273 instructs the camera unit 270 to start capturing a video image. The camera unit 270 records a video image captured by the camera 271-$m$ in the image data storage 272-$m$ (step S102).

In FIG. 11, a predetermined time is, for example, 5 seconds. After a lapse of the predetermined time from step S102, the controller 273 instructs the specific-color light unit 251 to turn on the specific-color lights 252 (step S103). After a lapse of the predetermined time from step S103, the controller 273 instructs the white light unit 260 to turn on the white lights 261 (step S104). The controller 273 instructs the specific-color light unit 251 to turn off the specific-color lights 252 (step S105). After a lapse of the predetermined time from step S104, the controller 273 instructs the white light unit 260 to turn off the white lights 261 (step S106).

The controller 273 instructs the camera unit 270 to stop capturing e video image. The camera unit 270 stops recording the video image (step S107). The controller 273 instructs the metadata generator 290 to stop generating metadata. The metadata generator 290 stops recording the generated metadata (step S108).

It is to be noted that, when the metadata generator 290 operates independent of the control of the controller 273, the controller 273 does not need to perform the steps S101 and S108.

Next, an example of a video image file generated by the measuring apparatus 3a will be described.

Figure 12:
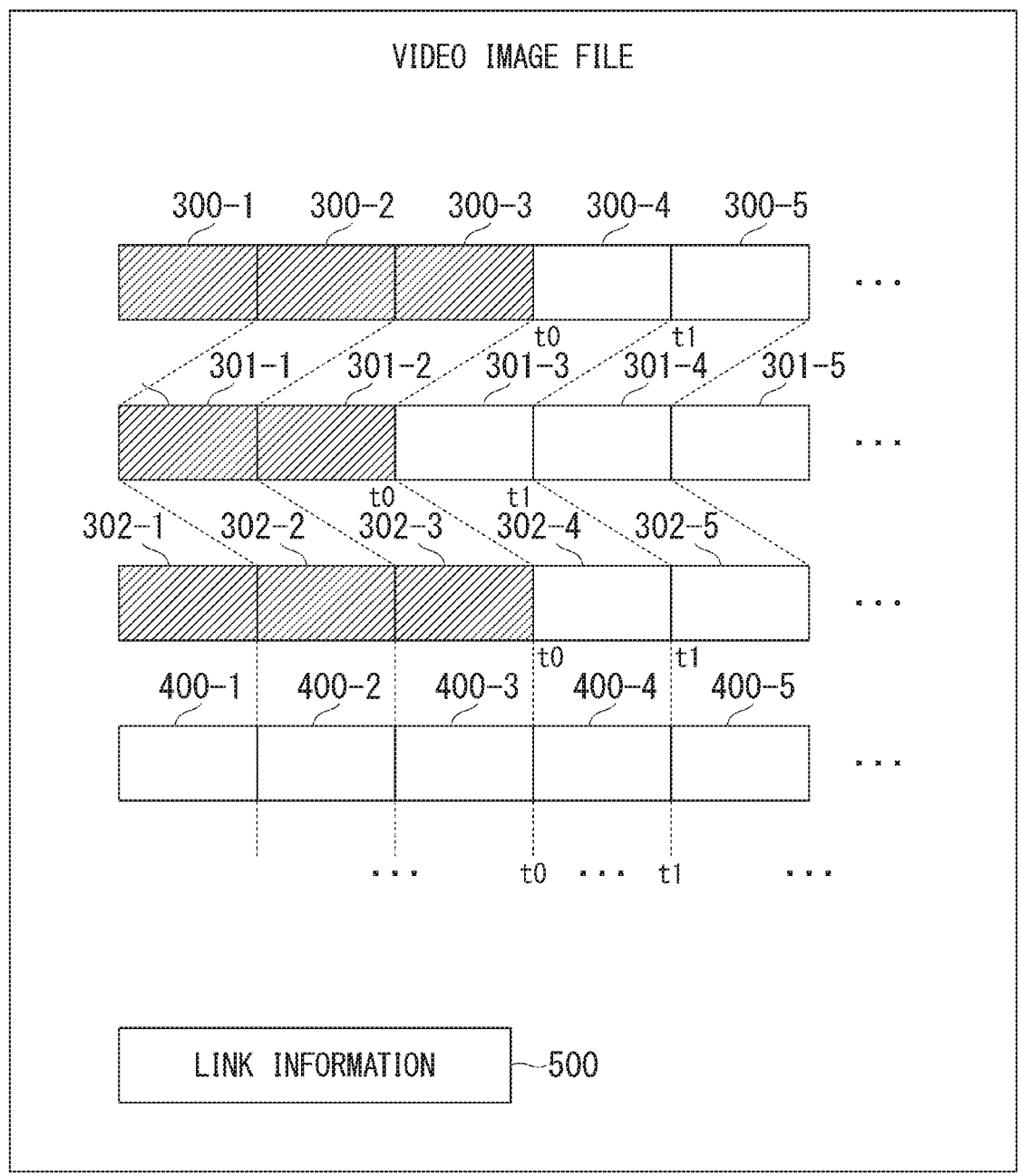
FIG. 12 is a diagram showing an example of a video image file in the first embodiment.

FIG. 12 is a diagram showing an example of the video image file. The detector 32 detects the difference luminance between chronologically adjacent frames for each video image. Frames 300 are chronological frames of a video image generated by the camera 271-1. In FIG. 12, light output from the white lights 261 is imaged in a frame 300-4. Therefore, the luminance of the frame 300-4 is higher than the luminance of a frame 300-3. Thus, the difference between the luminance of the frame 300-3 and the luminance of the frame 300-4 is equal to or greater than a predetermined threshold value.

Frames 301 are chronological frames of a video image generated by the camera 271-2. In FIG. 12, light output front the white lights 261 is imaged in a frame 301-3. Therefore, the luminance of the frame 301-3 is higher than the luminance of a frame 301-2. Thus, the difference between the luminance of the frame 301-2 and the luminance of the frame 301-3 is equal to or greater than the predetermined threshold value.

Frames 302 are chronological frames of a video image generated by the camera 271-3. In FIG. 12, light output from the white lights 261 is imaged frame 302-4. Therefore, the luminance of the frame 302-4 is higher than the luminance of a frame 302-3. Thus, the difference between the luminance of the frame 302-3 and the luminance of the frame 302-4 is equal to or greater than the predetermined threshold value. Metadata 400 is chronological data such as CTD. The metadata 400 may include turn-on time information of the white lights 261.

The linker 33 associates the frame 300-4, the frame 301-3, and the frame 302-4 at which the difference in luminance between chronological frames is equal to or greater than the threshold value with turn-on time t0 of the white lights 261. The linker 33 generates information indicating the correspondence in time between each frame and the metadata as link information. The controller 273 generates a video image file including the video images, the metadata, and the link information.

Next, an example of the operation of the measuring apparatus 3a will be described.

Figure 13:
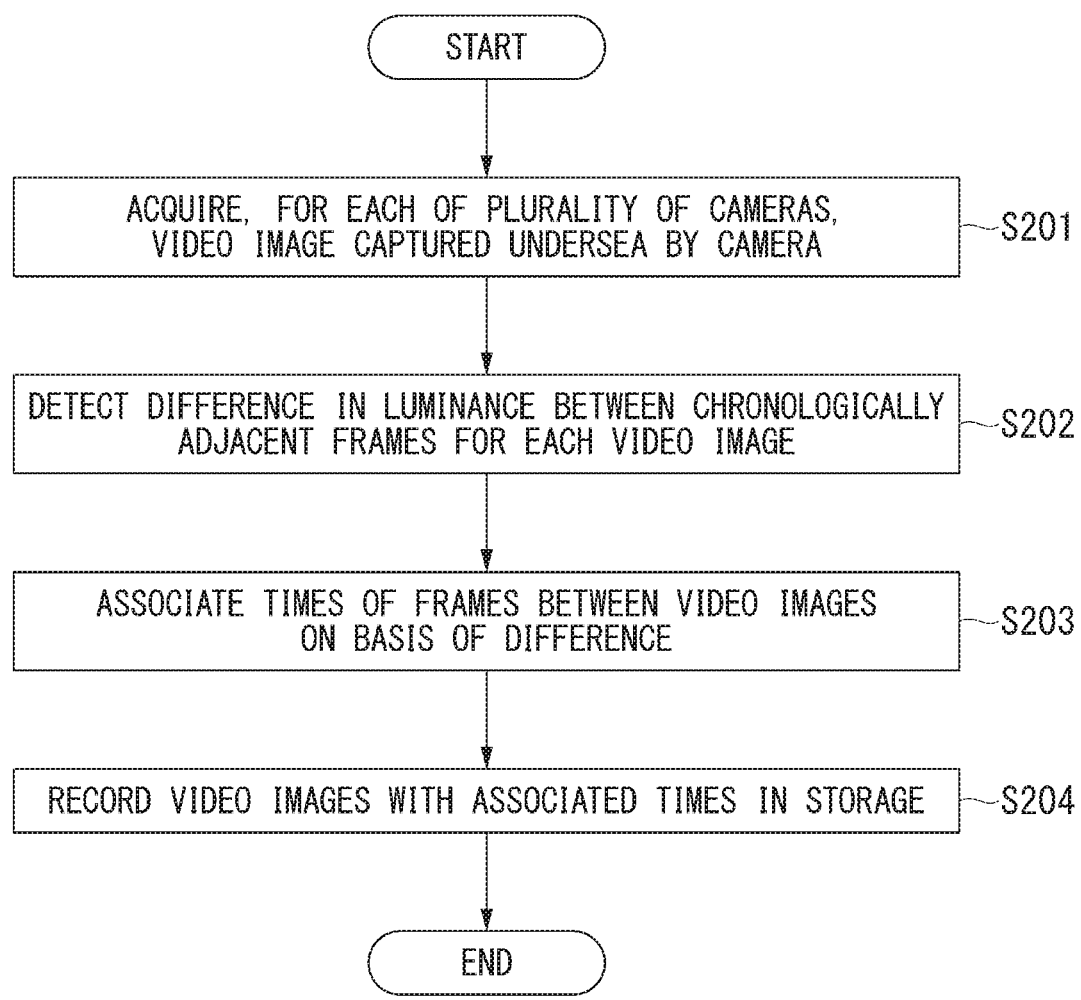
FIG. 13 is a diagram showing an example of a procedure for generating a video image file in the first embodiment.

FIG. 13 is a diagram showing an example of a procedure for generating a video image file. The acquirer 31 acquires, for each of the plurality of cameras 271, a video image captured undersea by the camera 271 (step S201). The detector 32 detects the difference in luminance between chronologically adjacent frames for each video image (step S202). The linker 33 associates the times of frames between the video images on the basis of the difference (step S203). The controller 34 records the video images with the associated times in the storage 35 (non-transitory recording medium) as a video image file (step S204).

As described above, the measuring apparatus 3a of the first embodiment includes the acquirer 31, the detector 32, the linker 33, and the controller 34. The acquirer 31 acquires, from the plurality of cameras 271, respective video images which the plurality of cameras 271 start capturing in the sea before the specific-color lights 252 of the specific-color light unit 251 are turned on and end capturing after the white lights 261 of the white light unit 260 are turned on after the specific-color lights 252 of the specific-color light unit 251 are turned on. The detector 32 detects the difference in luminance between chronologically adjacent frames for each video image. The linker 33 associates the times of frames between the video images on the basis of the difference. For example, the linker 33 associates the times of frames at which the difference in luminance between chronologically adjacent frames is equal to or greater than a threshold value between the video images. The controller 34 records the video images with the associated times in the storage 35 (non-transitory recording medium). For example, after the specific-color light 252-1 is lit in a specific color (red or the like) other than blue, the specific-color light 252-2 may further be lit in another specific color (yellow or the like) other than blue and the former specific color (red or the like).

Thus, the measuring apparatus 3a of the first embodiment can synchronize the times of video images generated in the sea by the plurality of cameras 271 and record them in a recording medium.

The image recording apparatus 2 of the first embodiment includes the camera unit 270, the specific-color light unit 251 as a first light unit, the image data storages 272, and the controller 273. The camera unit 270 images the subject in the sea. The specific-color light unit 251 includes, for example, a plurality of specific-color lights 252 that are lit in red. The image data storages 272 store images generated by the camera unit 270. After the camera unit 270 starts imaging, the controller 273 turns on, for example, the specific-color lights 252 that are lit in red.

Thus, the image recording apparatus 2 of the first embodiment can reduce the possibility that the organism to be imaged exits the imaging view angle. That is, the image recording apparatus 2 of the first embodiment can stay on the seafloor for a long period of time and record images that accurately represent ecology of the seafloor.

The image recording apparatus 2 of the first embodiment is a free fall type camera system for deep sea exploration. The image recording apparatus 2 of the first embodiment can intermittently capture a video image of an organism at the seafloor while monitoring the seafloor over a long period of time. The measuring apparatus 3a of the first embodiment can obtain the size of the organism at the seafloor from the captured image. The measuring apparatus 3a according to the first embodiment can accurately investigate ecology of the seafloor on the basis of link information such as imaging time, latitude, or longitude and metadata such as CTD data and water depth (depth).

The image recording apparatus 2 of the first embodiment does not need to include a high-sensitivity camera which is expensive. Therefore, the manufacturing cost of the image recording apparatus 2 is low. The image recording apparatus 2 is suitable for mass production because the manufacturing cost is low. The mass-produced image recording apparatus 2 can capture many locations.

Since the image recording apparatus 2 of the first embodiment intermittently images the seafloor, power consumption can be reduced. Since the image recording apparatus 2 of the first embodiment intermittently illuminates the seafloor with lights, power consumption can be reduced.

Since red lights arranged at intervals of the reference space SC are imaged by the stereo cameras, the measuring apparatus 3a can measure the size of the organism to be imaged on the basis of images generated by the stereo cameras. The measuring apparatus 3a can determine the ecology of light-sensitive organisms. The measuring apparatus 3a can obtain the amount of benthic organisms.

At least one of the image recording apparatus 2 and the measuring apparatus 3a according to the first embodiment associates link information with each image recorded for each camera 271. The measuring apparatus 3a of the first embodiment can easily obtain information from the image on the basis of the link information.

Marine organisms such as krill have properties that they come near light. If many such marine organisms are gathered around the image recording apparatus 2, the camera 271 images organisms such as krill which are not to be imaged. Since the image recording apparatus 2 of the first embodiment illuminates the seafloor with lights only for a short time, it is possible to prevent many marine organisms such as krill which are not to be imaged from gathering around the image recording apparatus 2.

The measuring apparatus 3a of the first embodiment includes the size measuring device 37. The size measuring device 37 measures the length X of the subject 110 on the basis of the reference space SC, the coefficient K, the distance Zi, and the distance Zx.

Thus, the image recording apparatus 2 of the first embodiment can measure the size of the organism to be imaged on the basis of the image. That is, the image recording apparatus 2 of the first embodiment can stay on the seafloor for a long period of time and record images that accurately represent ecology of the seafloor.

Second Embodiment

The second embodiment differs from the first embodiment in that the measuring apparatus has an altitude measuring device that measures the altitude of the image recording apparatus at the seafloor. In the second embodiment, only the differences from the first embodiment will be described.

Figure 14:
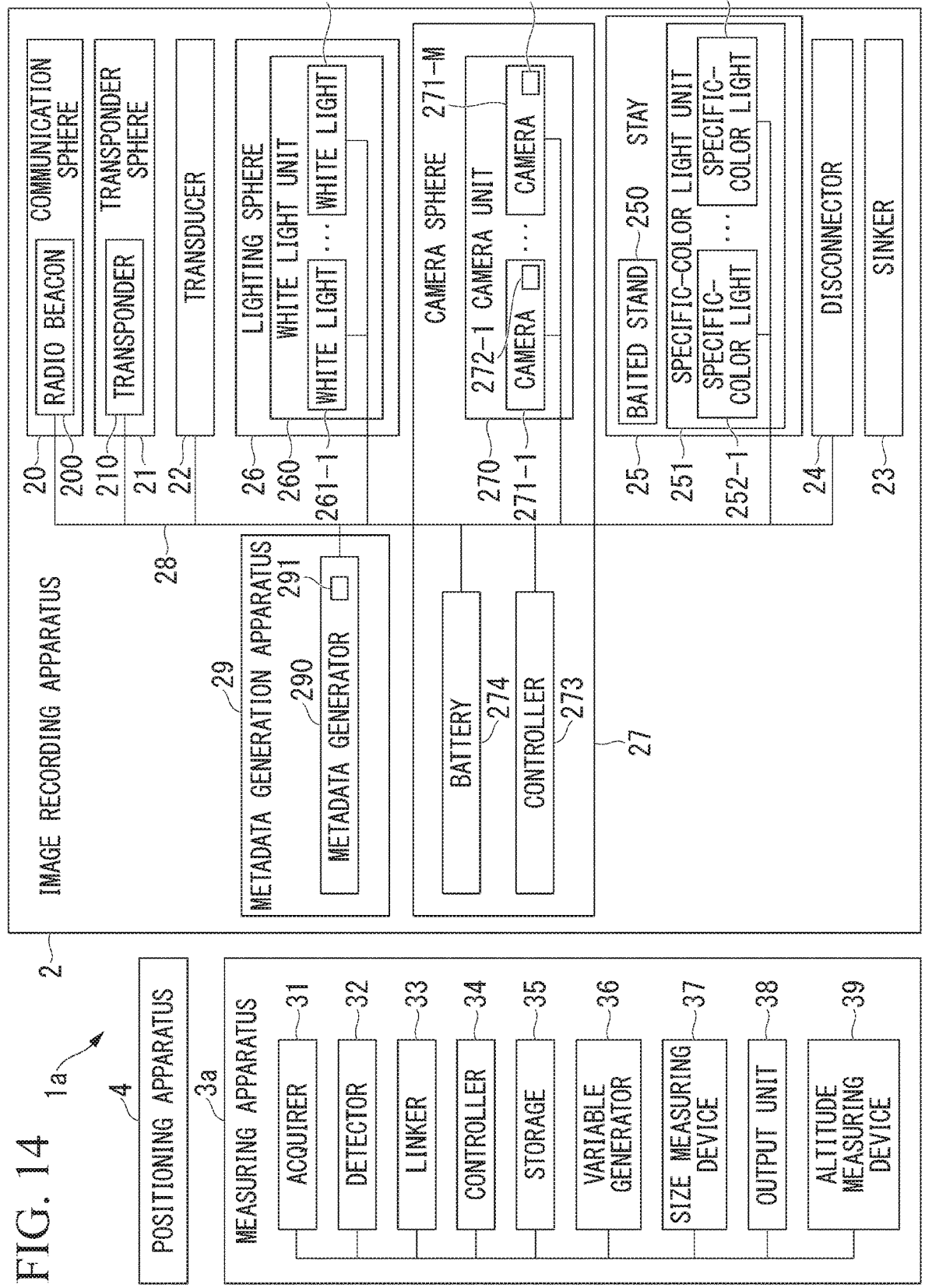
FIG. 14 is a diagram showing an example of the configuration of an image recording system in a second embodiment.

FIG. 14 is a diagram showing an example of the configuration of an image recording system 1b. The image recording system 1b is a system for recording images in an undersea environment. The image recording system 1b includes an image recording apparatus 2, a measuring apparatus 3b, and a positioning apparatus 4.

The seafloor on which the sinker 23 of the image recording apparatus 2 rests may sometimes be soft soil. When the seafloor on which the sinker 23 of the image recording apparatus 2 rests is soft soil, the sinker 23 is buried in the seafloor over time and therefore the altitude of the image recording apparatus 2 at the seafloor changes. Therefore, in the image recording system 1b, it is necessary to accurately obtain the altitude of the position of the camera(s) 271 at the seafloor after the image recording apparatus 2 is recovered to the mother ship.

Figure 15:
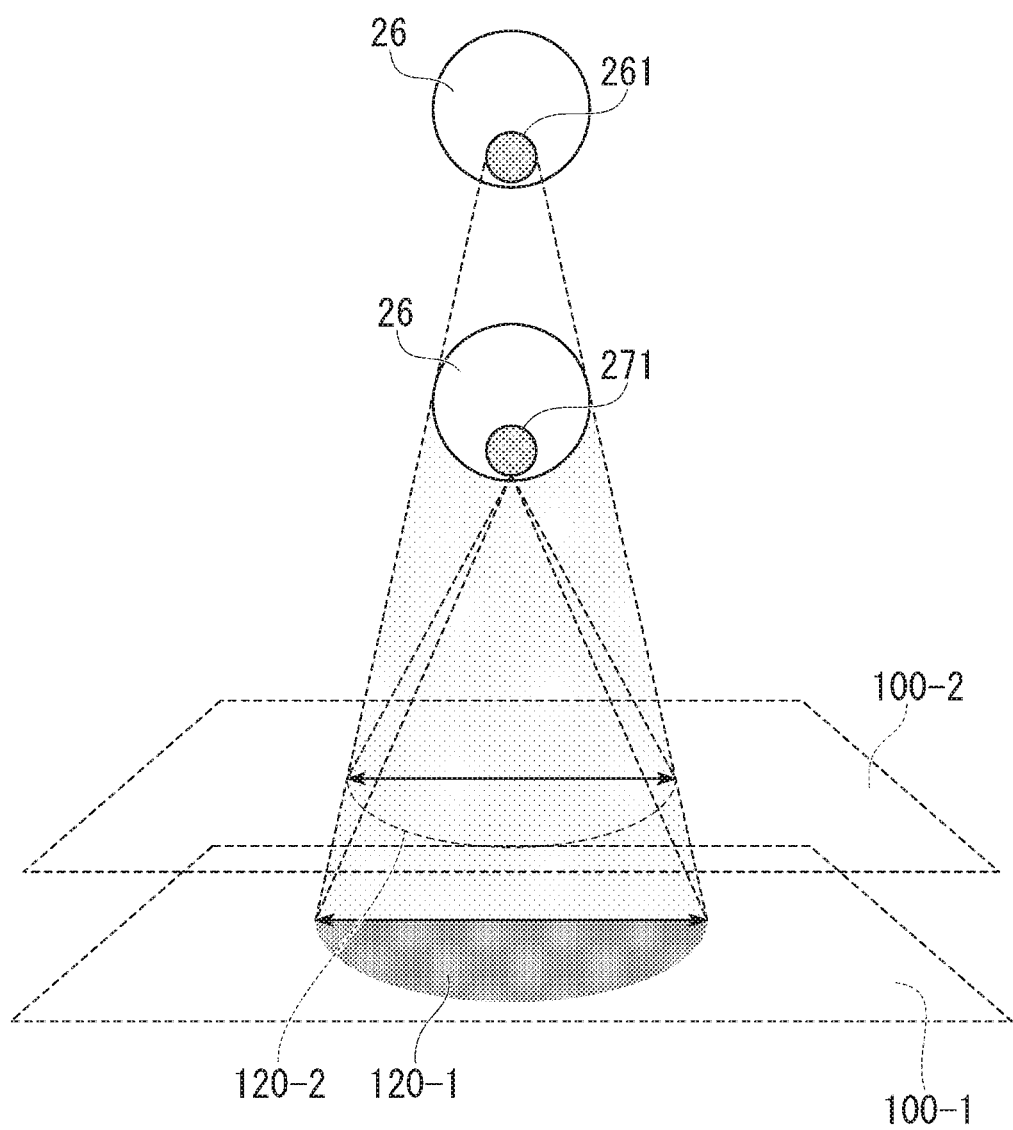
FIG. 15 is a diagram showing an example of a shadow in the second embodiment.

FIG. 15 is a diagram showing an example of a shadow 120. The relative positional relationship between the white lights 261 and the camera sphere 27 is constant. The actual diameter of the shadow 120 of the camera sphere 27 projected on the seafloor 100 is proportional to the altitude of the image recording apparatus 2. The actual diameter of the shadow 120 increases as the altitude of the image recording apparatus 2 from the seafloor 100 increases. At least one of the cameras 271 housed in the camera sphere 27 images the shadow 120 of the camera sphere 27 projected on the seafloor 100.

The relationship between the diameter or area of the shadow 120 and the altitude of the image recording apparatus 2 is calculated in advance on the basis of geometric conditions as shown in FIG. 15. The relationship between the diameter or area of the shadow 120 and the altitude of the image recording apparatus 2 may also be obtained by experimentally measuring it.

Figure 16:
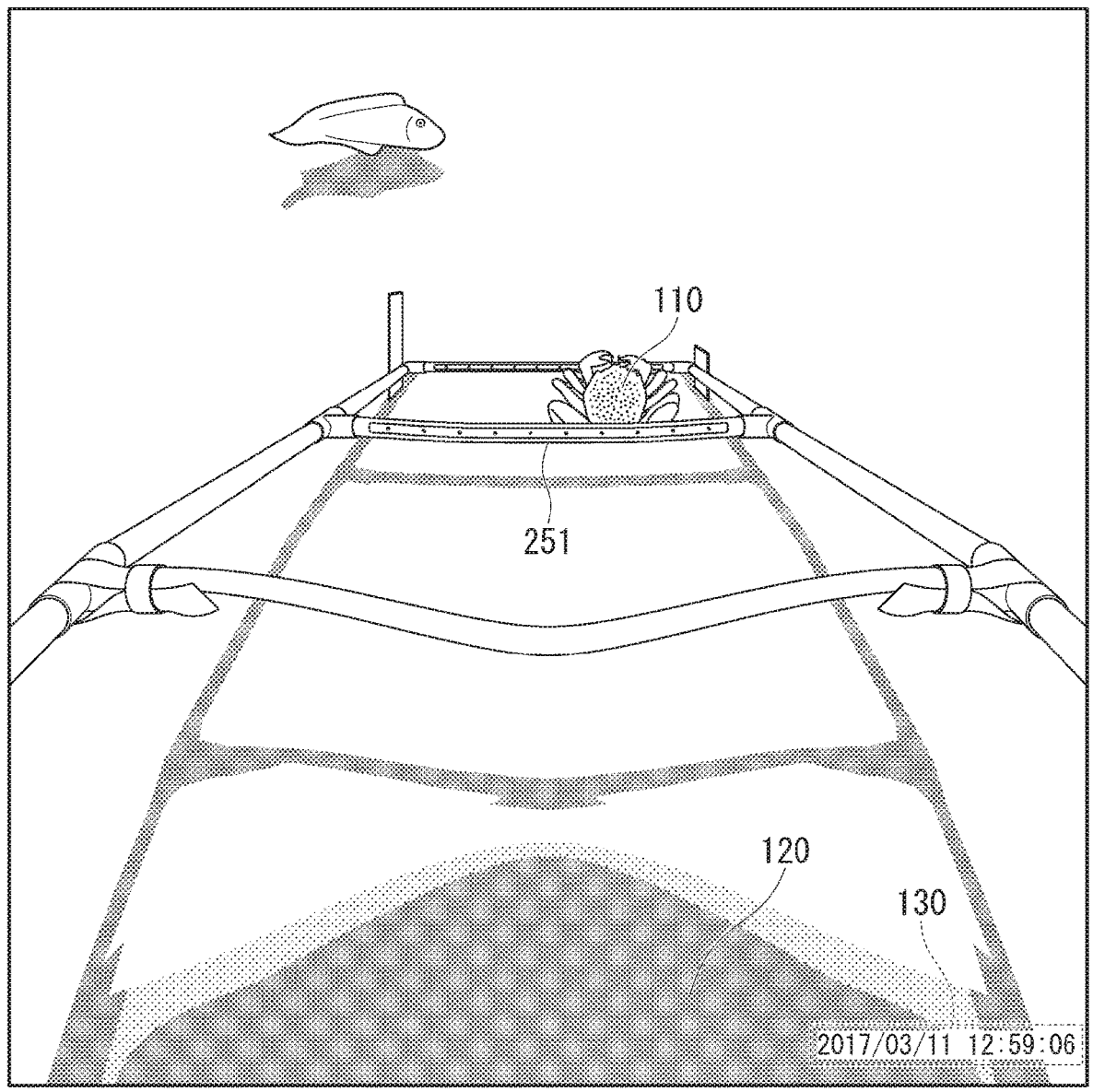
FIG. 16 is a diagram showing an example of an imaged shadow in the second embodiment.

FIG. 16 is a diagram showing an example of an imaged shadow 120. The diameter of an image of the shadow 120 in an image generated by at least one of the cameras 271 is proportional to the altitude of the image recording apparatus 2 from the seafloor 100. The diameter of the image of the shadow 120 in the image generated by at least one of the cameras 271 increases as the altitude of the image recording apparatus 2 from the seafloor 100 decreases. In FIG. 16, a time display area 130 is an area for displaying time information or the like.

Returning to FIG. 14, an example of the configuration of the measuring apparatus 3b will be described. The measuring apparatus 3b is a data processing apparatus. The measuring apparatus 3b includes an acquirer 31, a detector 32, a linker 33, a controller 34, a storage 35, a variable generator 36, a size measuring device 37, an output unit 38, an altitude measuring device 39. The altitude measuring device 39 is a data processing device such as a CPU that operates according to a program.

The altitude measuring device 39 may measure the altitude of the image recording apparatus 2 with respect to the seafloor 100 on the basis of the diameter or area of the shadow 120 of the camera sphere 27 projected on the seafloor 100 in the image generated by the camera 271 after the image recording apparatus 2 is recovered to the mother ship. The altitude measuring device 39 may correct a variable representing the measured altitude in a measuring process that uses the variable representing the altitude.

The altitude measuring device 39 may also measure the attitude (inclination) of the image recording apparatus 2 with respect to the seafloor 100 on the basis of the positional relationship between the stay 25 and the shadow of the stay 25 projected on the seafloor 100 in the image generated by the camera 271 after the image recording apparatus 2 is recovered to the mother ship.

The output unit 38 displays information representing the altitude of the image recording apparatus 2 with respect to the seafloor 100. The output unit 38 may also display information representing the attitude (inclination) of the image recording apparatus 2 with respect to the seafloor 100. The output unit 38 may display time information, superimposed in the time display area 130 defined in the image generated by the camera 271.

A scale for measuring the amount of sinking into the seafloor 100 may be drawn on the surface of the sinker 23. The camera 271-3 may image the sinker 23 that rests on the seafloor 100.

The camera 271-3 may record the image of the sinker 23 that rests on the seafloor 100 in the image data storage 272-3. The altitude measuring device 39 may measure the altitude of the position of the camera 271 at the seafloor 100 on the basis of the image of the scale drawn on the surface of the sinker 23 after the image recording apparatus 2 is recovered to the mother ship. The altitude measuring device 39 may correct the altitude information of the position of the camera 271 on the basis of the image of the scale drawn on the surface of the sinker 23 after the image recording apparatus 2 is recovered to the mother ship.

As described above, the measuring apparatus 3b of the second embodiment includes the altitude measuring device 39. The altitude measuring device 39 measures the altitude of the image recording apparatus 2 with respect to the seafloor 100 on the basis of the diameter or area of the shadow 120 of the camera sphere 27 projected on the seafloor 100 in the image generated by the camera 271. The altitude measuring device 39 may also measure the altitude of the position of the camera 271 at the seafloor 100 on the basis of the image of the scale drawn on the surface of the sinker 23.

Thus, the measuring apparatus 3b of the second embodiment can measure the altitude of the position of the camera 271 at the seafloor. The measuring apparatus 3b of the second embodiment can correct a variable representing the altitude of the image recording apparatus 2 in a predetermined measuring process. That is, the image recording apparatus 2 of the second embodiment can stay on the seafloor for a long period of time and record images that accurately represent ecology of the seafloor.

Each camera 271 of the image recording apparatus 2 can also monitor color tone changes of the seafloor sediment over a long period of time by imaging the seafloor illuminated with lights of a specific color such as red, yellow or white.

In addition, after recovering the image recording apparatus 2 that has monitored organisms and environments of the seafloor over a long period of time such as one year, the detector 32 of the measuring apparatus may compare, between video images of the cameras 271, the timing at which the difference in luminance between chronologically adjacent frames in the video image of the camera 271 becomes equal to or greater than the threshold value. Thus, even when time synchronization of the cameras 271 is not possible due to a failure of the cable 28 or the like, the detector 32 can detect time synchronization of video images of the cameras 271 on the basis of a result of the comparison. Further, the detector 32 can detect time synchronization of video images of the cameras 271 in units of frames of the video images.

At least a part of the image recording system, the image recording apparatus and the measuring apparatus according to the embodiments described above may be realized by a computer. In this case, the same may be realized by recording a program for realizing the corresponding functions on a computer readable recording medium and causing a computer system to read and execute the program recorded in the recording medium. The "computer system" referred to here includes an OS or hardware such as peripheral devices. The "computer-readable recording medium" refers to a portable medium such as a flexible disk, a magneto-optical disc, a ROM, or a CD-ROM or a storage apparatus such as a hard disk provided in a computer system. The "computer readable recording medium" may include something which dynamically holds a program for a short time, like a communication wire in the case in which the program is transmitted via a communication line such as a telephone line or a network such as the Internet, or something which holds a program for a certain period of time, like an internal volatile memory of a computer system serving as a server or a client in that case. The above program may be one for realizing some of the above-described functions and may also be one which can realize the above-described functions in combination with a program already recorded in the computer system or may be realized using a programmable logic device such as a field programmable gate array (FPGA).

Although embodiments of the present invention have been described above in detail with reference to the drawings, the specific configurations thereof are not limited to those of the embodiments and also include designs or the like without departing from the spirit of the present invention.

INDUSTRIAL APPLICABILITY

The present invention is applicable to a system for recording undersea environmental monitoring images, which is a system for monitoring undersea environment.

REFERENCE SIGNS LIST 1a, 1b Image recording system
2 Image recording apparatus
3a, 3b Measuring apparatus
4 Positioning apparatus
20 Communication sphere
21 Transponder sphere
22 Transducer
23 Sinker
24 Disconnector
25 Stay
26 Lighting sphere
27 Camera sphere
28 Cable
29 Metadata generation apparatus
31 Acquirer
32 Detector
33 Linker
34 Controller
35 Storage
36 Variable generator
37 Size measuring device
38 Output unit
39 Altitude measuring device
100 Seafloor
110 Subject
120 Shadow
130 time display area
200 Radio beacon
250 Baited stand
251 Specific-color light unit
252 Specific-color light
253 Light board
254 Power supply terminal
260 White light unit
261 White light
270 Camera unit
271 Camera
272 Image data storage
273 Controller
274 Battery
290 Metadata generator
291 Metadata storage
300 Frame
301 Frame
301 Frame
400 Metadata
500 Link information

The invention claimed is:

1. An image recording method in an image processing apparatus, the image recording method comprising:

acquiring, from a plurality of cameras which are not synchronized in time, respective video images which the plurality of cameras start capturing in the sea before a first light that is lit in a first color is turned on and end capturing after a second light that is lit in a second color is turned on after the first light is turned on;

detecting, for each of the respective video images acquired from the plurality of cameras, a difference in luminance between chronologically adjacent frames in the video image acquired from one of the plurality of cameras;

associating times of frames between the video images on the basis of the difference; and recording the video images with the associated times in a recording medium.

2. The image recording method according to claim 1, wherein, in the associating step, times of frames at which the difference in luminance between chronologically adjacent frames is equal to or greater than a threshold value are associated between the video images.

3. The image recording method according to claim 1, wherein, in the recording step, the video images and respective metadata are associated by time and recorded in a recording medium.

4. The image recording method according to claim 1, wherein, in the acquiring step, at least one of a plurality of first lights is lit in a third color other than the first and second colors after at least one of the first lights is lit in the first color, and the second light is lit in the second color after the first light is lit in the third color.

5. The image recording method according to claim 4, wherein the first color is a specific color other than blue, the second color is white, and the third color is a specific color other than blue and the first color.

6. A non-transitory computer readable storage medium storing an image recording program causing a computer to execute:

a procedure for acquiring, from a plurality of cameras which are not synchronized in time, respective video images which the plurality of cameras start capturing in the sea before a first light that is lit in a first color is turned on and end capturing after a second light that is lit in a second color is turned on after the first light is turned on;

a procedure for detecting, for each of the video images acquired from the plurality of cameras, a difference in luminance between chronologically adjacent frames in the video image acquired from one of the plurality of cameras;

a procedure for associating times of frames between the video images on the basis of the difference; and a procedure for recording the video images with the associated times in a recording medium.

7. An image processing apparatus comprising:

an acquirer configured to acquire, from a plurality of cameras which are not synchronized in time, respective video images which the plurality of cameras start capturing in the sea before a first light that is lit in a first color is turned on and end capturing after a second light that is lit in a second color is turned on after the first light is turned on;

a detector configured to detect, for each of the video images acquired from the plurality of cameras, a difference in luminance between chronologically adjacent frames in the video image acquired from one of the plurality of cameras;

a linker configured to associate times of frames between the video images on the basis of the difference; and a controller configured to record the video images with the associated times in a recording medium.

8. An image recording apparatus comprising:

a plurality of cameras configured to image a subject in the sea, wherein the plurality of cameras are not synchronized in time;

a plurality of first lights that are lit in a first color and arranged at intervals of a predetermined reference space;

a storage configured to store an image generated by the plurality of cameras;

a controller configured to turn on the first light after the plurality of cameras start imaging; and a second light that is lit in a second color, wherein the controller is configured to turn on the second light after a predetermined time elapses from turning on at least one of the first lights, and the plurality of cameras configured to direct image the plurality of first lights and the subject.

9. The image recording apparatus according to claim 8, wherein and the plurality of cameras are configured to image the subject from different directions.

10. The image recording apparatus according to claim 8, wherein the plurality of cameras are configured to image a shadow of the image recording apparatus projected on a seafloor.

11. The image recording apparatus according to claim 8, wherein the storage stores at least one of imaging time information and a latitude, a longitude, and a water depth of the image recording apparatus in association with the image.

* * * * *